Jan. 29, 1935.  B. C. PLACE  1,989,559
FINISHING AUTOMOBILE OR SIMILAR BODIES
Filed April 28, 1930
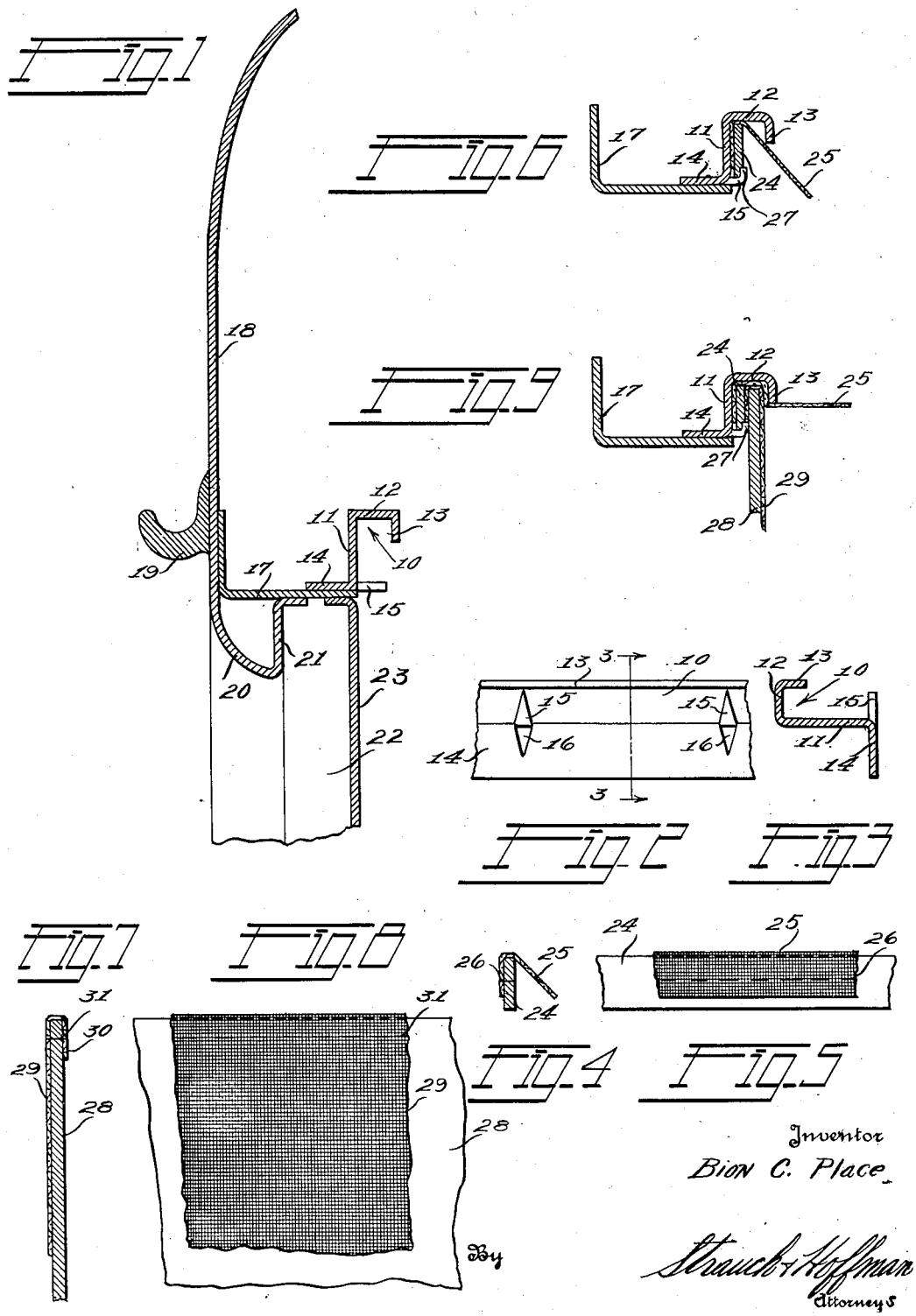
Inventor
BION C. Place Patented Jan. 29, 1935

1,989,559

UNITED STATES PATENT OFFICE 1,989,559

FINISHING AUTOMOBILE OR SIMILAR BODIES

Bion C. Place, Detroit, Mich., assignor of one-half to George E. Gagnier, Detroit, Mich.

Application April 28, 1930, Serial No. 447,953

13 Claims. (Cl. 296—137)

This invention relates to a method and arrangement for finishing the interior of vehicle bodies such as automobile bodies. More particularly, the invention relates to a novel method and arrangement of securing the head lining and the side finish panels or material to the frame of the body adjacent the upper corners thereof.

The primary object of the invention is to provide a simple method and arrangement for securing the head lining and the side finish materials of the vehicle body to the metallic or similar frame of such a body, in such manner that a single sheet metal element, preferably shaped to provide a channel is utilized to secure the head lining as well as the side panels or material so that said lining and the side finishing material are held at all points along the length thereof providing a neat and smooth joint adjacent the upper corner of the automobile body that may be produced with a minimum of expenditure of time and at a relatively low cost.

A still further object of the invention is to produce a novel method and arrangement for securing the head lining and the finish material for the sides of an automobile or similar body to the frame of that body without using fasteners that could be applied only at intervals along the length of said lining or finish material, and in which such fasteners are replaced by a continuous sheet metal strip that firmly holds the lining and finish material at all points.

Another object of the invention is to provide a novel method and arrangement for securing trim material to the inside of a metal body without using wooden strips to receive driven fasteners for the purpose of attaching the material to the metal body.

Further objects of the invention reside in the provision of an arrangement permitting the convenient securing of the head lining in the angle of a metallic securing member in advance of the attachment of the side lining material to the same member.

Further objects of the invention will appear as a description thereof proceeds with reference to the accompanying drawing, in which—

Figure 1 is a fragmentary vertical sectional view through a portion of an automobile body showing the improved sheet metal member provided to secure the head lining and the side covering material in place.

Figure 2 is a fragmentary plan view of the sheet metal connecting member forming an essential part of this invention.

Figure 3 is a sectional view taken on the plane indicated by the line 3—3 in Figure 2.

Figures 4 and 5, are, respectively, sectional and side elevational views of the head lining and the reinforcing strip applied thereto.

Figure 6 is a sectional view showing the head lining in position in the securing member with the securing prongs bent so as to secure said lining to said member.

Figures 7 and 8 are, respectively, sectional and side elevational views showing a side panel designed to be secured in place by the securing elements of this invention.

Figure 9 is a sectional view showing the lining and side covering in final assembled relation.

Like reference characters indicate like parts throughout the several figures.

This invention is intended particularly to secure the head lining and the side covering of a vehicle body, such as an automobile body, to the framework of said body without utilizing a multiplicity of fasteners and wooden attaching strips. To this end a unitary metallic securing member, preferably formed of sheet metal, is utilized, and said member is so formed as to readily permit its attachment to the sides of the body, and so as to provide a channel to receive the edge of the head lining as well as an edge of the side panel or similar covering material that is used to finish the sides of the vehicle body. While the invention is intended particularly for use in connection with automobile bodies, it will be readily understood that it is capable of application in any situation where it is desired to secure finishing panels or materials to a corner of a frame of any character.

The, at present preferred, form of securing member is illustrated in detail in Figures 2 and 3 of the drawing and constitutes a sheet metal member, constructed of sheet steel or the like and bent to provide the channel 10. Preferably said channel is provided, as shown in the figures just referred to, by bending an edge of a sheet metal strip 11 at right angles to form the bottom 12 of the channel and by then bending the edge of said bottom again at right angles into substantial parallelism with the body 11 forming a flange 13, constituting one of the side walls of the channel 10. Preferably the side wall 13 is substantially shorter than the opposite side wall of the channel formed by the body 11.

The other edge of said body 11 is turned in a direction opposite from the bottom of the channel 12 to provide an attaching flange 14 of suitable width. Preferably, for the purpose hereinafter described, prongs 15 are stuck from the flange 14 and turned at right angles to the body 11 in a direction opposite from the flange 14, said prongs prior to being bent as just described, occupying the openings 16 in the flange 14.

The sheet metal member just described is utilized to attach the head lining and the side covering to the frame of the body. In order to illustrate a preferred manner of application of said member to an automobile body, a conventional automobile body construction is illustrated in Figure 1 of the drawing, and the securing member is assembled therewith in the preferred manner. The illustrated conventional body construction consists of an angle iron 17 that constitutes one of the frame members of the body, such member extending around the body above the doors and windows therein, adjacent the top thereof. Attached to the angle iron 17 is the sheet metal covering 18 forming the eaves of the roof of the body, which may carry molding 19. The lower edge of the sheet metal member 18 is bent to form a bead 20 having a straight inner wall 21 constituting a wall of the groove in which the window slides. Such groove is designated by the numeral 22. The inner sheathing of the body is designated by the numeral 23. The construction of the body of the automobile just referred to forms no part of this invention, the particular construction illustrated being selected merely as an example of a type of body construction to which this invention may be applied.

When the invention is applied to a body construction, as illustrated and just referred to, the flange 14 of my securing member is attached to the horizontal leg of the angle iron 17 that surrounds the body adjacent the top thereof. The flange 14 may be secured by spot welding, riveting, or in any other convenient manner. As illustrated in Figure 1 the securing member is attached to the frame of the automobile body in such a manner that the channel 10 therein opens downwardly, and the inner surface of the body 11, constituting one of the walls of the channel, is preferably arranged so as to be in alignment with the inner surface of the sheathing 23.

Preferably, in order to firmly secure the head lining which forms the ceiling of the automobile body to the channel-shaped member just described, said lining is attached at its edge to a relatively stiff fibre strip 24 (Figures 4 and 5). The head lining is designated by the numeral 25 in these figures. As indicated the head lining is lapped around a corner of the strip 24 and is stitched at 26 to the fibrous or similar reinforcing strip. After the edge of the head lining is reinforced, as just described, said re-inforced edge is inserted in the channel 10 with the edge of the head lining that laps the strip 24 disposed between the body 11, constituting one side wall of the panel 10 and the strip 24. The assembly of the head lining and its reinforcing strip in the channel shaped securing member is illustrated in Figure 6 of the drawing. As indicated in this figure the reinforcing strip 24 is made of the width co-extensive with the width of wall 11 of the channel shaped member, so that after the reinforcing strip is applied against said wall the end of the prongs 15 may be bent upwardly, as indicated at 27 and will serve to clamp the head lining and its reinforcing strip against that wall of the channel. If desired sufficient pressure may be applied to the upwardly turned end of the prong 15 to cause said prongs to bite into the fibrous material constituting the reinforcement for the edge of the head lining, so as to provide an uninterrupted surface, although as illustrated in the drawing, the prongs may only partly enter said fibrous material.

After the head lining has been secured in position in the manner just described the covering for the adjacent side of the body is secured in the same channel 10 in the following manner. Preferably, and usually, the sides of the body except at the door and window opening are covered with panels of suitable size each of the panels consisting of a fibrous body 28 of cardboard or any other suitable material of proper size having the exposed surface thereof covered by means of a fabric covering 29 of any approved kind, the fabric lapping the edge of the body 28 and being extended around to the rear of said body as indicated at 30. The fabric covering at a point where it laps the back of the fibrous body is stitched to said body as indicated at 31.

The panel covered as just described is inserted with its edge in the channel 10 as indicated in Figure 9 of the drawing. The width of the channel is such that when the edge of the panel is inserted therein said edge will snugly fit between the stiffening member 24 for the head liner and the opposite wall of the channel 10 serving to firmly clamp the portion of the head lining that extends between the edges of the reinforcement 24 against the side wall 13 of the channel member, providing a continuous snug joint between the lining and the securing member at all points along the length thereof. A smooth, neat-appearing, joint is thus provided.

The edge of the side panel most remote from that which is disposed in the channel 10 is preferably secured by a suitable snap fastener. A fastener well adapted for this use is disclosed in my Patent #1,679,266, granted July 31, 1928. By utilizing a securing member having a channel to receive an edge of the panel, the latter is held firmly at all points along the length of the channel, and the attachment of the panel is greatly facilitated because it is secured by simply slipping one panel edge in said channel and by then causing the fasteners applied to the opposite edge to snap into the perforations in the frame provided to receive them.

The portions of the head lining other than the edge inserted in the channel of the securing member are secured in the usual manner, this constituting no part of the present invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What I claim and desire to secure by United States Letters Patent is:

1. In combination with the frame of an automobile or similar body, a metallic unitary channel-shaped member secured to said frame within said body with its channel opening downwardly, a roof lining extending across said channel, a relatively stiff reinforcing strip attached to an edge of said lining, said strip and the edge of the lining being disposed in said channel with the lining disposed in clamped relation between said strip and a wall of the channel and means to secure said strip in said channel.

2. In combination with a frame of an automobile or similar body, a channel-shaped member secured to said frame within said body adjacent the corner between the roof lining and side covering, said channel opening downwardly, a roof lining extending across said channel, a relatively stiff reinforcing strip attached to the edge of said lining, said strip and the edge of the lining being disposed at said channel with the lining disposed in clamped relation between said strip and a wall of the channel, and tongues struck from said member and bent around said strip to interlock it and the lining carried thereby to said member.

3. In combination with a frame of an automobile or similar body, a channel-shaped member secured to said frame within said body adjacent the corner between the roof lining and side covering, said channel opening downwardly, a roof lining, a relatively stiff reinforcing strip attached to the edge of said lining, said strip and the edge of the lining being disposed in said channel with the lining between said strip and a wall of the channel, and a side panel disposed in said channel between said strip and the wall of said channel opposite said first named wall whereby the edges of said lining and said side panel are held in said channel.

4. In combination with a frame of an automobile body or similar body, a channel-shaped member secured to said frame with the channel opening downwardly, a roof lining having an edge thereof disposed across said channel and secured to the remote side wall thereof, and a side panel having an edge disposed within said channel between the edge of said lining and the opposite side wall of said channel so as to hold said lining in contact with said last named wall at all points along the length of said panel.

5. In combination with a frame of an automobile or similar body, a channel-shaped member secured to said frame with the channel opening downwardly, a roof lining, a reinforcing strip attached to said lining, said strip at the edge of the lining being disposed in said channel against one of the side walls thereof, with the lining between said strip and said side wall, said lining being extended from said last named side across the opposite side wall of said channel, and a side panel disposed in said channel between said strip and said opposite side wall of the channel, said side panel serving to clamp the lining between it and said opposite side wall.

6. In combination with a frame of an automobile or similar body, a channel-shaped member secured to said frame with its channel opening downwardly, a roof lining, a reinforcing strip attached to an edge of said lining, said strip and said edge of the lining being disposed in said channel with the lining between said strip and the side wall of the channel nearest to the outside of said body, prongs struck from said member and bent around said strip to secure it against said side wall, a side panel consisting of a body and an outer lining lapped around an edge of siad body, said edge, including the lining, being disposed in said channel between said strip and the side wall thereof opposite said first named side wall, whereby said lining and the edge of the panel are held in position at all points throughout the extent of said channel.

7. In combination with the frame of an automobile or similar body, a unitary securing member constructed of sheet metal and bent to provide a channel of a uniform width sufficient to snugly receive the stiffened edges of finish material extending in opposite directions from said member, and finish material having the adjacent edges thereof received side by side in said channel, and means struck from said member to hold the finish material in position during assembly.

8. In combination with the frame of an automobile or similar body, a channel-shaped member having parallel side walls disposed in a corner of said body with the channel thereof opening inwardly from said corner, a roof lining extending across said channel and secured to one wall of the channel and a side panel having its edge disposed between said roof lining and the other wall of said channel and filling the space between said lining and the last named wall.

9. In combination with the frame of an automobile or similar body, a channel-shaped member provided with a straight relatively long and a parallel shorter side wall disposed in a corner of said body with the channel thereof opening inwardly from said corner, a roof lining extending across said channel and secured to the longer wall of said channel by tongues struck from said wall and a side panel disposed in and snugly filling the space between said roof lining and the other wall of said channel.

10. The method of attaching side and roof lining material to a continuous metallic channel disposed in a corner of an automobile body, which consists in disposing an edge of the roof lining material in said channel, securing said edge to one wall of said channel, and then inserting an edge of the side lining material between the edge of the roof lining material and the other wall of said channel.

11. An automobile or similar body, comprising a member providing a channel opening inwardly toward a corner of said body and arranged to provide continuous spaced parallel walls, lining material extending in one direction away from said channel and having an edge thereof disposed in contact with and separately attached to one of said walls, and further lining material extending in another direction away from said channel having its edge snugly disposed between the edge of said first named lining material and the other wall of said channel.

12. In combination with the frame of an automobile or similar body, a channel-shaped member having parallel side walls disposed in said body frame so that one of said walls is approximately in alinement with the uncovered inner surface of said body and so that said channel opens downwardly, a roof lining secured to said last named wall, and a side panel having its edge snugly fitting between the other wall of said channel and said lining material.

13. In combination with the frame of an automobile or similar body, a channel-shaped member having parallel side walls disposed in said body frame so that one of said walls is approximately in alinement with the uncovered inner surface of said body and so that said channel opens downwardly, a roof lining secured to said last named wall by teeth struck from said wall, and a side panel snugly fitting between said lining and the other wall of said channel.

BION C. PLACE.